United States Patent
Wiener et al.

(10) Patent No.: US 11,179,008 B2
(45) Date of Patent: Nov. 23, 2021

(54) PORTABLE MULTI-FUNCTION HERB GRINDER

(71) Applicants: Aaron Wiener, Northbrook, IL (US); Steven Hoffmann, Olathe, KS (US); William Seitter, Overland Parl, KS (US)

(72) Inventors: Aaron Wiener, Northbrook, IL (US); Steven Hoffmann, Olathe, KS (US); William Seitter, Overland Parl, KS (US)

( * ) Notice: Subject to any disclaimer, the term of this patent is extended or adjusted under 35 U.S.C. 154(b) by 166 days.

(21) Appl. No.: 16/411,114

(22) Filed: May 13, 2019

(65) Prior Publication Data

US 2019/0343333 A1    Nov. 14, 2019

Related U.S. Application Data

(60) Provisional application No. 62/671,395, filed on May 14, 2018.

(51) Int. Cl.
*A47J 42/40* (2006.01)
*A47J 42/34* (2006.01)
(Continued)

(52) U.S. Cl.
CPC ............... *A47J 42/40* (2013.01); *A47J 42/24* (2013.01); *A47J 42/32* (2013.01); *A47J 42/34* (2013.01)

(58) Field of Classification Search
CPC ..... A24F 3/00; A24B 7/06; A47J 42/24; A47J 42/32; A47J 42/34; A47J 42/40; B02C 7/02; B02C 7/04; B02C 7/08; B02C 13/22; B02C 18/2216; B02C 18/22; B65D 47/061; B65D 47/068; B65D 47/241; B65D 47/242; B65D 47/244; B65D 47/243
(Continued)

(56) References Cited

U.S. PATENT DOCUMENTS

| | | | | |
|---|---|---|---|---|
| 928,793 | A | * | 7/1909 | Perkins ................ B65D 47/242 222/521 |
| 1,974,348 | A | * | 9/1934 | Strehsadam ........... B65D 47/20 222/507 |

(Continued)

*Primary Examiner* — Michael McCullough
(74) *Attorney, Agent, or Firm* — Greensfelder Hemker & Gale, PC; Jared S. Manse

(57) ABSTRACT

The invention includes manually operated portable multi-functional herb grinding and vertically dispensing means. The said means is a portable herb grinding device, with storage for raw unused and finished ground dried herbs, that allows grinding and precision vertical dispensing of dried herbs. The said herb grinding device comprising of a manually operated mating grinding rotor and stator, the first of which includes raw material storage and the second part, which removably connects to the said first part, has an integrated storage chamber and precision dispenser. The said first part rotates during the grinding operation and accommodates storage of unused herbs. The said second part is stationary during the grinding operation and accommodates the storage and vertical precision dispensing of the ground product. The dispensing mechanism on the end which can be opened allowing the user to vertically dispense the ground herb in a precise manner or closed for storage or transport.

14 Claims, 6 Drawing Sheets

(51) Int. Cl.
*A47J 42/24* (2006.01)
*A47J 42/32* (2006.01)

(58) Field of Classification Search
USPC .......... 241/168–169.2; 222/457.5, 547, 461, 222/519, 520, 521
See application file for complete search history.

(56) References Cited

U.S. PATENT DOCUMENTS

| | | | | |
|---|---|---|---|---|
| 2,104,413 | A * | 1/1938 | Cahoon | B65D 47/242 222/521 |
| 6,135,329 | A * | 10/2000 | Stoneberg | B65D 47/242 222/521 |
| 6,299,038 | B1 * | 10/2001 | Schmeisser | B65D 47/242 222/521 |
| 8,083,167 | B1 * | 12/2011 | Namakian | A47J 42/24 241/169.1 |
| 8,708,203 | B2 * | 4/2014 | Laible | B65D 47/122 222/481.5 |
| 9,737,092 | B2 * | 8/2017 | Grumbacher | A24C 5/40 |
| 2014/0353412 | A1 * | 12/2014 | Grumbacher | A24C 5/40 241/70 |
| 2016/0262448 | A1 * | 9/2016 | Zeitlin | A24F 19/10 |
| 2017/0112324 | A1 * | 4/2017 | Kaczmarek | A47J 42/10 |
| 2017/0245541 | A1 * | 8/2017 | Pagan | A47J 42/34 |
| 2017/0319009 | A1 * | 11/2017 | Seckel | B02C 18/2216 |
| 2018/0271328 | A1 * | 9/2018 | Petrossian | A47J 42/24 |
| 2020/0268207 | A1 * | 8/2020 | Abehasera | A47J 42/26 |
| 2020/0269254 | A1 * | 8/2020 | Abehasera | G01G 23/3721 |

* cited by examiner

PORTABLE MULTI-FUNCTION HERB GRINDER

BACKGROUND OF THE INVENTION

The present invention relates to grinders and in particular, to devices for storing, grinding and vertically dispensing herbs.

There are a variety of herb grinders in the market for the purpose of grinding dried herbs and spices into particles. Herb grinders are also used for grinding tobacco and Cannabis for ease of use. Conventional herb grinders comprising of a stator and rotor grinding mechanism can be operated by mechanical or electronic means. The electronic operated herb grinders are more expensive and can damage the product and the herb if they generate excessive heat. They also require electrical power sources such as batteries to operate which may not always be available.

The ground herb product is typically dispensed as the herb grinder is being operated. Many grinders lack dispensing mechanisms at all and instead require that the ground herb be scooped out from a center cavity. Those in the art may or may not have the means to prevent residual ground product from falling when not in use. The dispensing mechanism in some grinders is not controlled, thereby allowing the ground herbs to fall over a large surface area. This makes it difficult to load bowls and joints without spilling. Some grinders require complicated assembly and are bulky to carry around. They can be cumbersome to use if they do not have the means to store unused raw and finished ground products.

The field of herb grinders has a need for a portable herb grinder with raw and finished product storage that is easy to operate and allows for precise, vertical dispensing. The present invention solves these and other problems with prior art.

BRIEF SUMMARY OF THE INVENTION

The invention covers a multifunctional portable grinding and vertically dispensing herb grinder. The said herb grinder has the ability to grind herbs, tobacco, or Cannabis directly into an integrated storage container and dispenser mechanism that allows for precision vertical dispensing. The said grinder also includes a means for storing wax, shatter, kief or unground herbs. This advantage of a single means for grinding dried herbs with the dual storage for both raw and finished products along with precision vertical dispensing has not been contemplated by the prior art.

The herb grinder comprises of a manually operated mating grinding rotor and grinding stator, the first of which includes raw material storage and the second part, which removably connects to the said first part, has an integrated storage chamber and vertical precision dispenser. The said first part rotates during the grinding operation. It can accommodate storage of wax, shatter, kief or unground herbs. The said second part is stationary during the grinding operation. It accommodates the storage and precision dispensing of the ground product.

Other objects and advantages of the present invention will become apparent from the following description, taken in connection with the accompanying drawings, wherein, by way of illustrations and examples, various embodiments of the present invention are disclosed. The invention discloses a single means for grinding and dispensing herbs with precision while allowing for storage of unused raw and finished ground dried herbs.

BRIEF DESCRIPTION OF THE DRAWINGS

Throughout the drawings, it should be noted that like reference numbers are used to depict the same or similar elements, features and structures.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Therefore, the following is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to fall within the scope of the invention.

Figure 1:
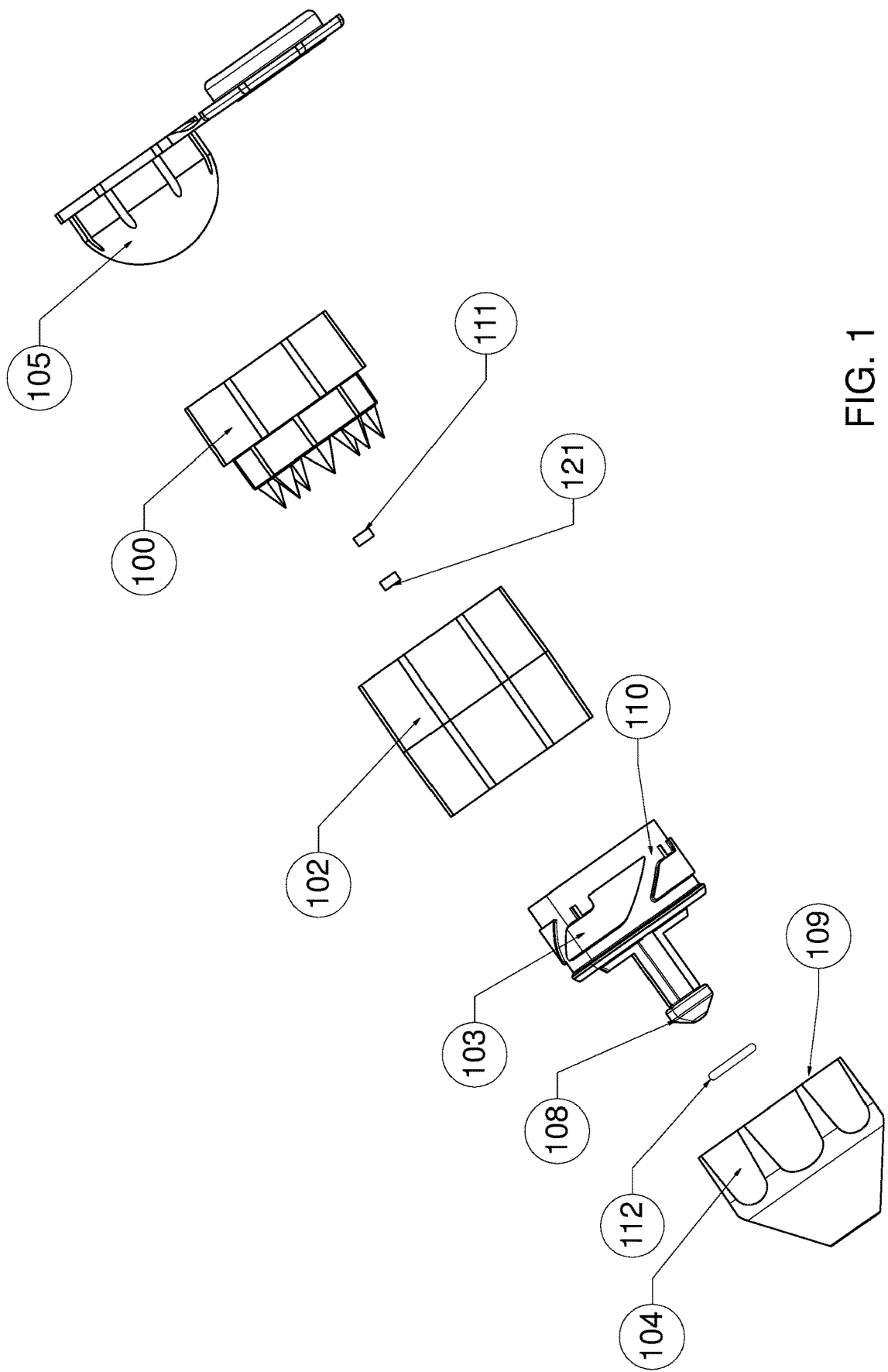
FIG. 1 is an exploded view showing all the parts of the preferred embodiment of the herb grinder
Figure 4:
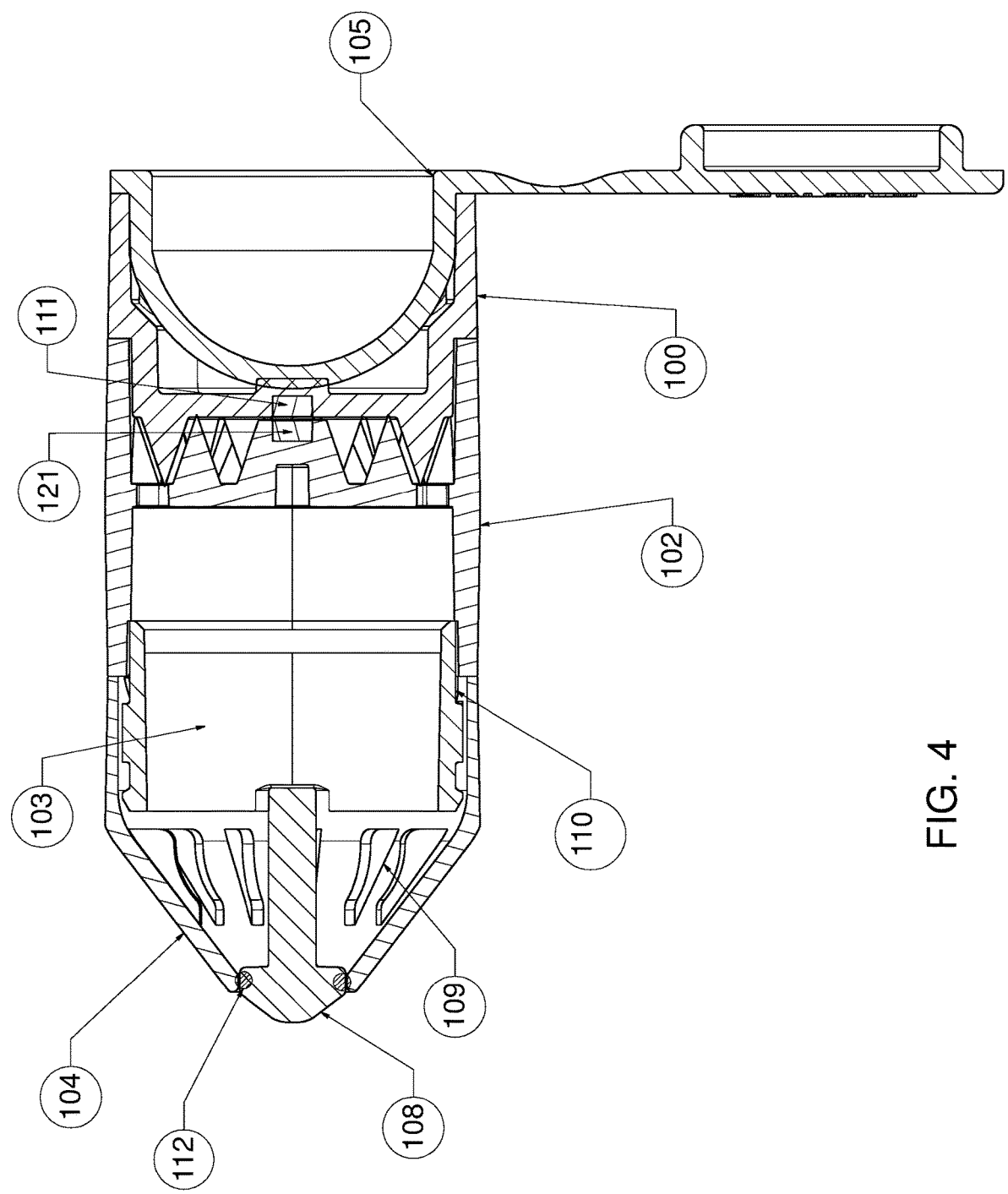
FIG. 4 is a section view showing all parts of the preferred embodiment of the herb grinder shown in FIG. 1

Referring now to FIG. 1, there is shown an exploded view of all components of the preferred embodiment of the herb grinder. FIG. 4 shows a section view of all components of the preferred embodiment of the herb grinder seen in FIG. 1. The herb grinder comprises of a manually operated rotor and stator combination, the first 100 of which is the part that rotates during the grinding operation and the second 102 of which is intended to be stationary during the grinding operation. The said first part 100 has a magnet 111 installed on the side that faces the said second part 102. The said second part 102 has a corresponding magnet 121 installed on the side that faces said first 100 part. This magnet combination of 111 and 121 allows the said first 100 and second 102 parts to be retained together during times of storage and transportation.

The said first part 100 is closed on one end by the container with lid 105 by means of mechanical tension. The said container with lid 105 is a storage compartment for wax, shatter, kief or unground herbs.

The said second part 102 is attached to a track plug mechanism 103 by suitable methods known in the art. The said track plug mechanism 103 comprises of a helical track 110 and a plug 108 with o-ring 112. The track plug mechanism 103 connects the stator housing 102 and the dispensing mechanism 104 together, allowing the dispensing mechanism to open and separate from the internal plug mechanism 108 with o-ring 112 to dispense the ground herb. The said plug 108 seals the ground herb in the conical storage chamber of the dispensing mechanism 104 when in the closed position. The said dispensing mechanism 104 comprises of a conical storage chamber with agitators 109 and the said track plug mechanism 103. The said agitators 109 are in the form of fins inside the said conical storage chamber. It should be noted that these could be in various forms to facilitate dispensing as known in the art. The said conical storage chamber rotates on the helical track 110 of the said track plug mechanism 103 to open and close positions. The said preferred embodiment of the herb grinder comprises of all mechanical components and requires no electrical components.

To operate the grinder, the user will separate said first part 100 from said second part 102 to add the herbs to be ground in said second part 102. During the grinding operation, the dried herbs or tobacco or Cannabis are ground into the finished product by the rotation motion of the said first part 100 in either direction. The ground herb falls vertically into the conical storage chamber of said dispensing mechanism 104 below. The ground herb remains stored until the said dispensing mechanism 104 is opened by twisting the said dispensing mechanism 104 counterclockwise, releasing it from the mechanical lock mechanism at the top of the helical track 110 enabling the said dispensing mechanism 104 to move down along the helical track 110 of said track plug mechanism 103 where in the dispensing mechanism 104 will snap over a mechanical ramp into a circular track where it can rotate freely bidirectionally. This bidirectional rotation dispenses the ground herb vertically out the opening in the dispensing mechanism 104 in a precise fashion. After dispensing the required ground herb, the said dispensing mechanism 104 can be closed by rotating the said dispensing mechanism 104 clockwise and up along the helical track of said track plug mechanism 103 sealing on the O-ring 112 that is radially attached to the plug.

Figure 2:
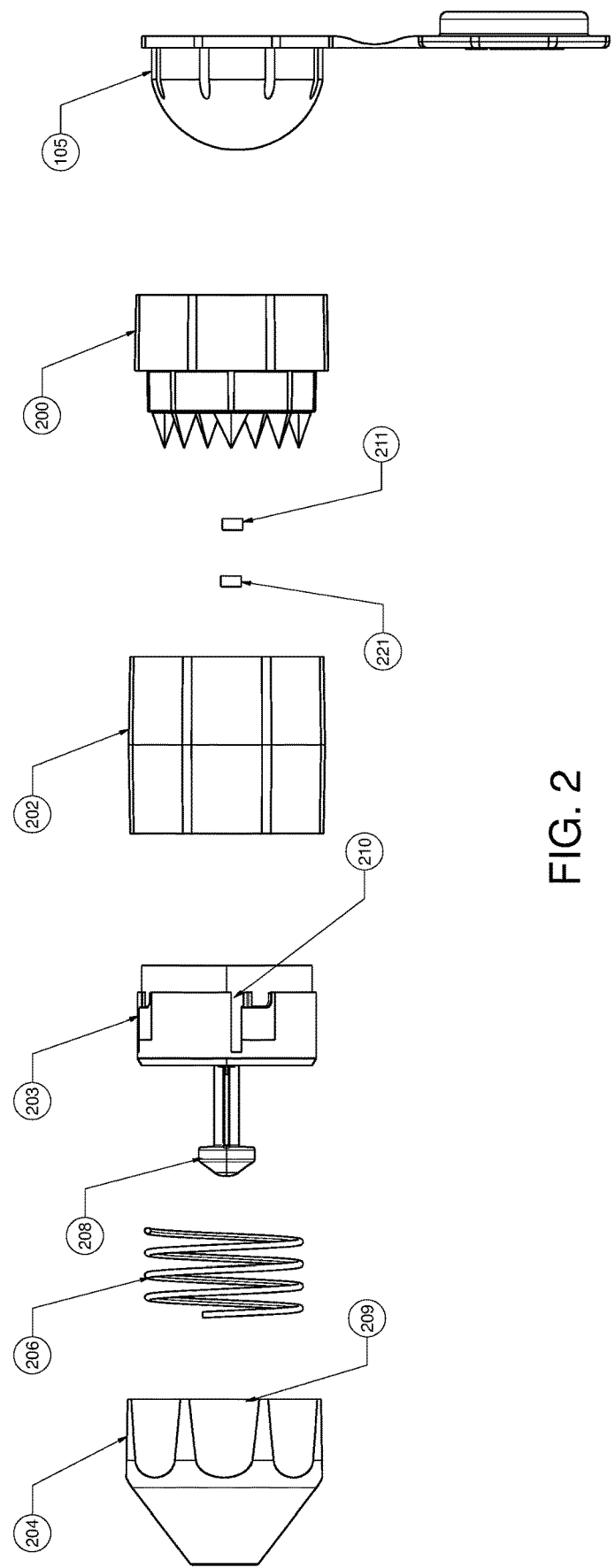
FIG. 2 is an exploded view showing all parts of an alternate embodiment of the herb grinder

FIG. 2 shows an exploded view of an alternate embodiment of the herb grinder. The herb grinder comprises of a manually operated rotor and stator combination, the first 200 of which is the part that rotates during the grinding operation and the second 202 of which is intended to be stationary during the grinding operation. The said first part 200 has a magnet 211 installed on the side that faces the said second part 202. The said second part 202 has a corresponding magnet 221 installed on the side that faces said first 200 part. This magnet combination of 211 and 221 allows the said first 200 and second 202 parts to be retained together during times of storage and transportation.

The said first part 200 is closed on one end by container with lid 105 by means of mechanical tension. The said container with lid 105 is a storage compartment for wax, shatter kief or unground herbs. To operate the grinder, the user will separate said first part 200 from said second part 202 to add the herbs to be ground in said second part 202. During the grinding operation, the dried herbs or tobacco or Cannabis are ground into the finished product by the rotation motion of the said first part 200 in either direction. The ground herb falls vertically through holes in the second part 202 into the conical storage chamber of the dispensing mechanism 204 below.

The said second part 202 is attached to a track plug mechanism 203 by suitable methods known in the art. The said track plug mechanism 203 comprises of vertical rails 210 and a plug 208. The said plug 208 seals the ground herbs in the conical storage chamber of the said dispensing mechanism 204 via an o-ring incorporated into the plug mechanism of 203 or surface on surface contact seal between the plug mechanism of 203 and dispensing mechanism 204. The said dispensing mechanism 204 comprises of a conical storage chamber with agitator 209 and the said track plug mechanism 203. The ground herb falls down vertically into the storage chamber of said dispensing mechanism 204. The ground herb remains stored until the said dispensing mechanism 204 is opened by twisting the said conical storage chamber of the said dispensing mechanism 204 counterclockwise. This unlocks the said conical storage chamber, thereby, allowing it ride up and down the said vertical rails 210. Compression spring 206 assists in opening the said conical storage chamber, thereby, dispensing the ground herb vertically in a precise fashion. After dispensing the required ground herb, the said dispensing mechanism 204 can be closed by pushing it up towards said second part 202, thereby, compressing the said spring 206 and rotating the said dispensing mechanism 204 clockwise to lock it in the closed position. The said conical chamber of the said dispensing mechanism 204 when opened to an unlocked position moves up and down along the vertical rails 210 of the said track plug mechanism 203 to open and close positions. The said alternate embodiment of the herb grinder comprises of all mechanical components and requires no electrical components.

Figure 3:
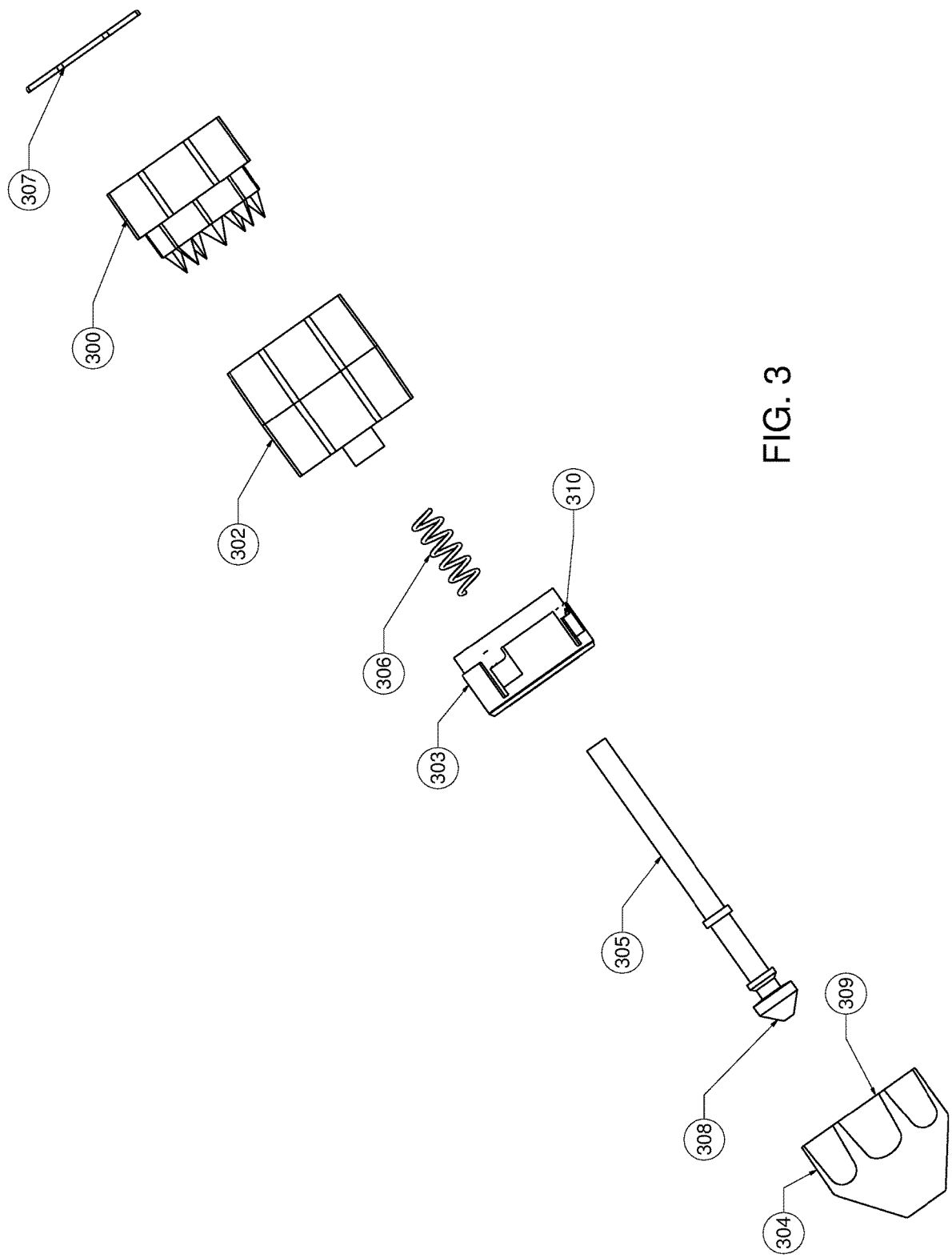
FIG. 3 is an exploded view showing all parts of another alternate embodiment of the herb grinder

FIG. 3 shows an exploded view of another alternate embodiment of the herb grinder. The herb grinder comprises of a manually operated grinding assembly with storage and dispensing mechanism. The said grinding assembly comprises of a rotor 300 which is the part that rotates during the grinding operation and is removably attached to a shaft 305, which can rotate or remain stationary, that runs along the length of the said herb grinder and a stator 302 which is intended to be stationary during the grinding operation.

The said first part 300 is closed on one end by the end cap 307 by means of mechanical tension. The said end cap 307 can be replaced by a storage container with lid, that has a hole in the middle for the shaft 305 to pass through, for storing wax, shatter, kief or other unground herbs. To operate the grinder, the user will separate said rotor-shaft assembly 300-305 from said stator 302 to add the herbs to be ground in said stator 302. During the grinding operation, the dried herbs or tobacco or Cannabis are ground into the finished product by the rotation motion of the said rotor-shaft assembly 300-305 in either direction. The ground herb falls down vertically into the conical storage chamber of said dispensing mechanism 304.

The said shaft 305 as it runs along the length of the said herb grinder has a compression spring 306 on it between said stator 302 and track mechanism 303. The lower end of the said shaft 305 comprises of plug 308 to seal the ground herbs in the conical storage chamber of the said dispensing mechanism 304. The ground herb remains stored until the said shaft 305 is unlocked by twisting or pressing down on the shaft or until the said conical chamber of the said dispensing mechanism 304 is unlocked by twisting it counterclockwise, thereby, allowing it ride up and down rail 310, guided by 302 and 303 as the user presses the shaft down and the spring returns it back to the open state. The compression of said spring 306 by the vertical press of the said shaft 305 moves the said plug 308 thereby, opening the tip of the said conical chamber of the said dispensing mechanism 304 and dispensing the ground herb vertically in a precise fashion. After dispensing the required ground herb, the said dispensing mechanism 304 can be closed by pushing the said shaft 305 downward into a fully compressed state and rotating it so the plug 308 is sealed against the dispensing tip 304 via an o-ring incorporated on the plug 305 or surface to surface contact seal between the plug 305 and dispensing mechanism 304. Alternatively, the said dispensing mechanism 304 can also be sealed by keeping the shaft 305 in the fully extended position and pressing up on the unlocked said conical chamber of the said dispensing mechanism 304 and then twisting said conical chamber of the said dispensing mechanism 304 in a clockwise or counterclockwise motion. The said alternate embodiment of the herb grinder comprises of all mechanical components and requires no electrical components.

Figure 5:
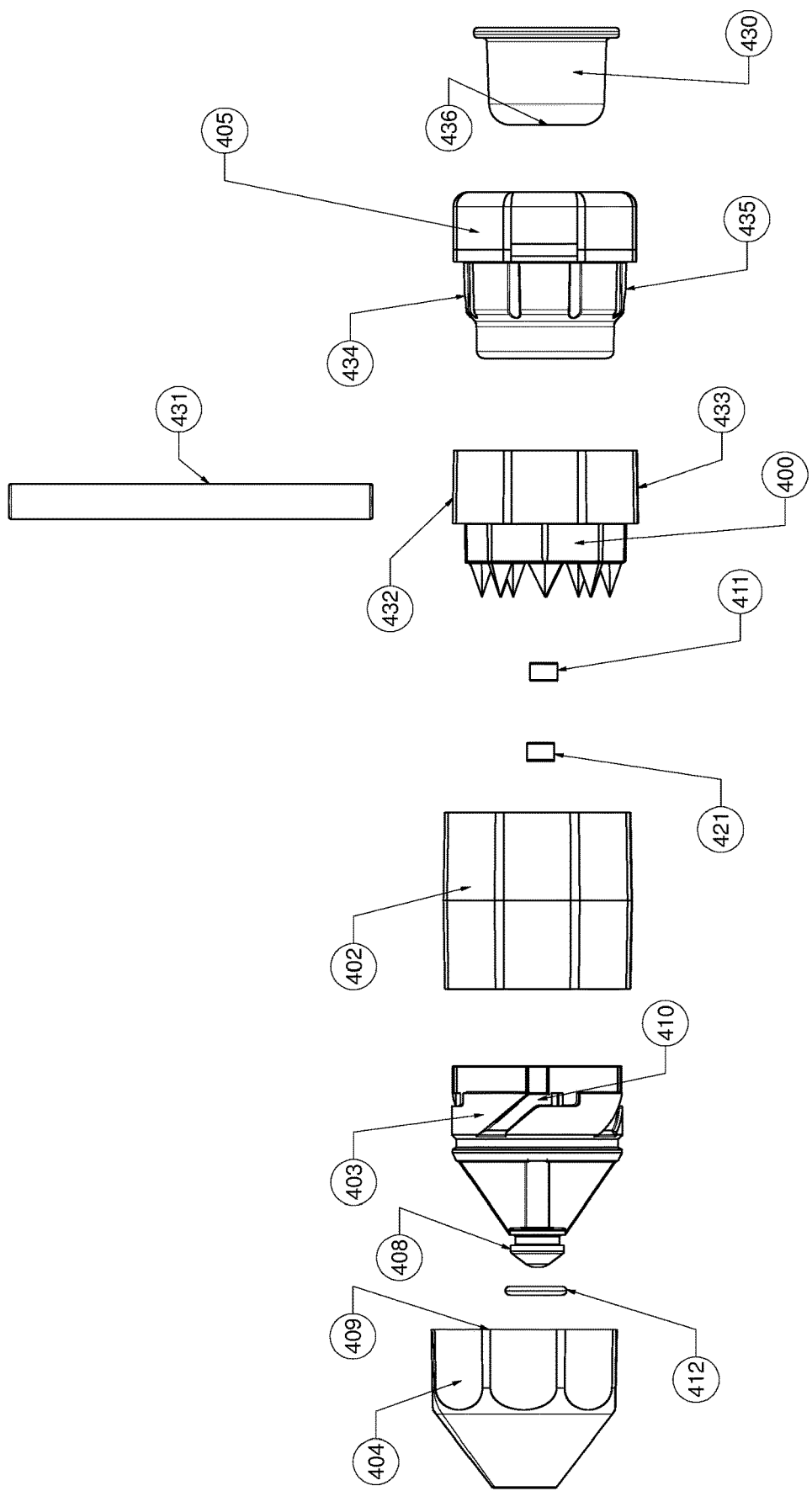
FIG. 5 is an exploded view showing all parts of another alternate embodiment of the herb grinder
Figure 6:
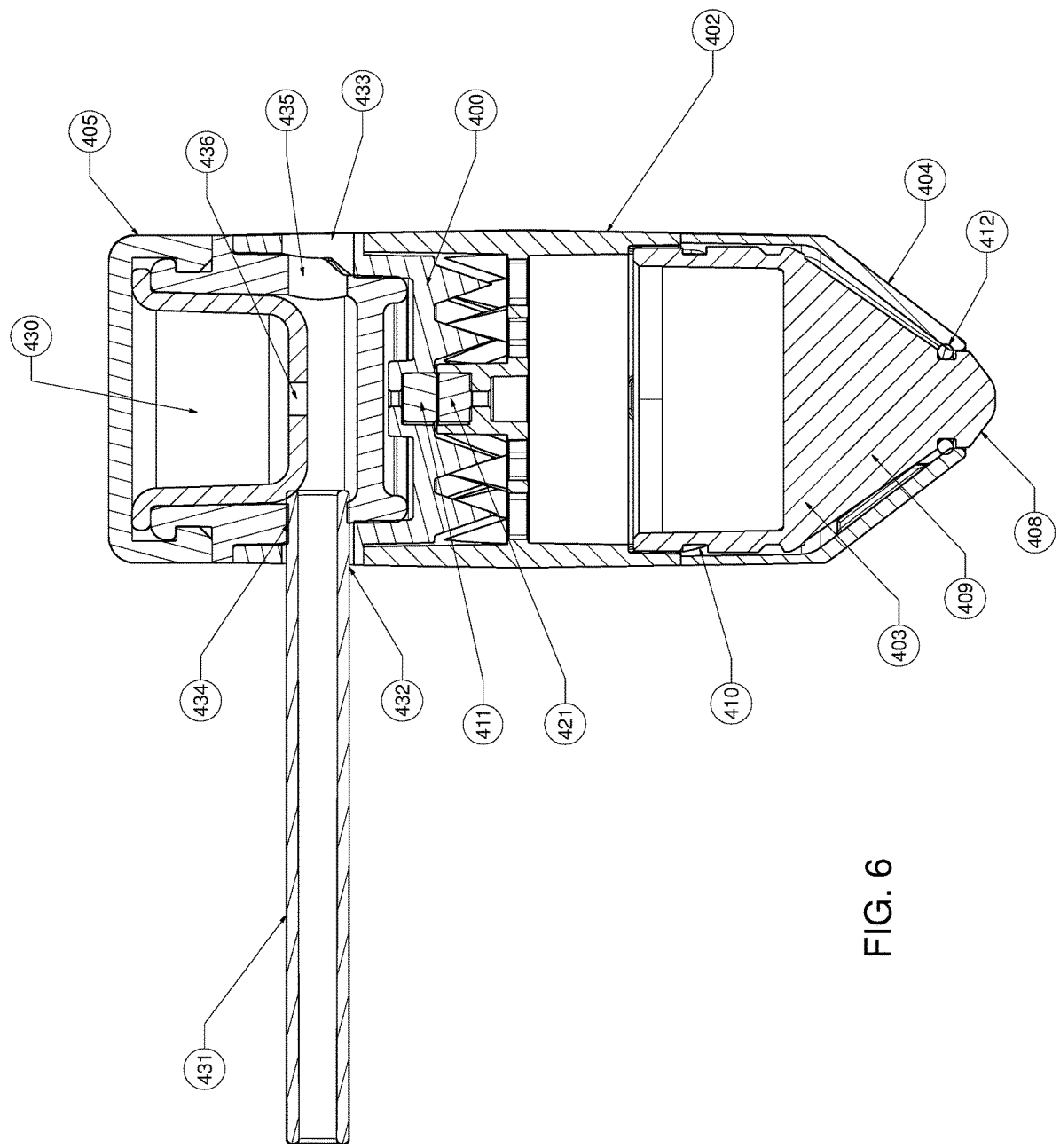
FIG. 6 is a section view showing all parts of the alternate embodiment of the herb grinder shown in FIG. 5

Referring now to FIG. 5, there is shown an exploded view of all components of an alternate embodiment of the herb grinder. FIG. 6 shows a section view of all components of the alternate embodiment of the herb grinder seen in FIG. 5. The herb grinder comprises of a manually operated rotor and stator combination, the first 400 of which is the part that rotates during the grinding operation and the second 402 of which is intended to be stationary during the grinding operation. The said first part 400 has a magnet 411 installed on the side that faces the said second part 402. The said second part 402 has a corresponding magnet 421 installed on the side that faces said first 400 part. This magnet combination of 411 and 421 allows the said first 400 and second 402 parts to be retained together during times of storage and transportation.

The said first part 400 is closed on one end by the container with lid 405 by means of mechanical tension. The said container with lid 405 contains a metal, glass or ceramic bowl 430 with a hole in the bottom 436 that is retained by mechanical tension with the container and lid 405. When the lid of 405 is closed, the bowl 430 is completely covered for easy transport. Wherein when the lid of 405 is opened the assembly containing the rotor 400, container with lid 405 and bowl 430 can be removed as one and placed under the dispensing tip 404 for loading the bowl 430. After the bowl 430 is loaded the assembly can be placed back on top of the stator 402 or remain detached while the user smokes via the addition of a pipe 431. The container with lid has holes 434 and 435 in the sides which align with holes 432 and 433 in the rotor 400 interchangeably. The pipe 431, which could be made out of plastic, ceramic, glass, wood or metal, can pass through either hole 432 or 433 in the rotor 400 to slide into and seal in holes 434 or 435. Wherein the holes 432-435 that don't have the pipe 431 installed allow the user to cover it with their finger, typically referred to as a carb to those familiar in the art, when lighting the bowl 430 to pull in smoke through the bottom of bowl 430 filling the chamber existing in the gap between the container with lid 405 and the bowl 430, along with the pipe 431. Removing your finger from covering holes 432-435 that don't have pipe 431 installed, allows you to inhale clearing the chamber of smoke.

The said second part 402 is attached to a track plug mechanism 403 by suitable methods known in the art. The said track plug mechanism 403 comprises of a helical track 410 and a plug 408. The track plug mechanism 403 connects the stator housing 402 and the dispensing mechanism 404 together, allowing the dispensing mechanism to open and separate from the internal plug mechanism 408 to dispense. The said plug 408 seals the ground herbs in the conical storage chamber of the dispensing mechanism 404 when in the closed position via the o-ring 412 incorporated on the plug of track plug mechanism 403. The said dispensing mechanism 404 comprises of a conical storage chamber with agitators 409 and the said track plug mechanism 403. The said agitators 409 are in the form of fins inside the said conical storage chamber. It should be noted that these could be in various forms to facilitate dispensing as known in the art. The said conical storage chamber rotates on the helical track 410 of the said track plug mechanism 403 to open and close positions. The said preferred embodiment of the herb grinder comprises of all mechanical components and requires no electrical components.

To operate the grinder, the user will separate said first part 400 from said second part 402 to add the herbs to be ground in said second part 402. During the grinding operation, the dried herbs or tobacco or Cannabis are ground into the finished product by the rotation motion of the said first part 400 in either direction. The ground herb falls down vertically into the conical storage chamber of said dispensing mechanism 404. The ground herb remains stored until the said dispensing mechanism 404 is opened by twisting the said dispensing mechanism 404 counterclockwise and down along the helical track of said track plug mechanism 403. This dispenses the ground herb vertically in a precise fashion. After dispensing the required ground herb, the said dispensing mechanism 404 can be closed by rotating the said dispensing mechanism 404 clockwise and up along the helical track of said track plug mechanism 403.

In accordance with the invention, the components described in all embodiments above can be made from any combination of materials already known in the art. This can include metals, plastics, composites, silicones, rubbers, polymers, acrylics and any combination of the same.

What is claimed is:

1. A manually operated portable multi-functional herb grinder to grind, store, and vertically dispense dried herbs and other plant materials comprising of a storage container with lid; a grinding rotor, a grinding stator with integrated storage housing, a track plug mechanism and a dispensing tip;

wherein the storage container removably connects to the top side of the grinding rotor;

wherein the grinding stator with one set of grinding elements and the grinding rotor with a reciprocal set of grinding elements are removably connected to each other and can rotate freely bi-directionally in a circular motion when connected;

wherein the grinding stator storage housing catches the ground herb from the grinding stator via holes in the grinding stator;

wherein the grinding stator storage housing is sealed closed via the dispensing tip, when in the closed position, and the bottom half of the rotor when connected to the top half of the stator;

wherein the track plug mechanism comprising of a track and integrated plug is connected to the grinding stator storage housing to facilitate the opening and closing of the dispensing tip as it moves up and down the track;

wherein the dispensing tip moves along a circular track of the track plug mechanism wherein the open position, allowing it to rotate 360° bi-directionally to vertically dispense the contents of the storage housing;

wherein the dispensing tip when in the locked and closed position of the track, is sealed closed via the integrated plug on the track plug mechanism that is internal to the grinder;

wherein the inside of the dispensing tip contains agitators to help propel ground plant out of the dispensing tip when in the open position.

2. The manually operated portable multi-functional herb grinder of claim 1, wherein a compression spring is incorporated between the grinding stator storage housing and the dispensing tip.

3. The manually operated portable multi-functional herb grinder of claim 1, wherein a compression spring is incorporated between the grinding stator storage housing and the dispensing tip;

wherein the track of the track plug mechanism comprises of vertical rails to guide the movement of the dispensing tip to open and a mechanical lock at the top of the track to lock the dispensing tip closed.

4. The manually operated portable multi-functional grinder of claim 1, wherein a compression spring is incorporated between the grinding stator storage housing and the dispensing tip;
wherein the track of the track plug mechanism comprises of helical rails to guide the movement of the dispensing tip to open and a mechanical lock at the top of the track to lock the dispensing tip closed.

5. A manually operated portable multi-functional herb grinder to grind, store, and vertically dispense dried herbs and other plant materials comprising of a lid; a grinding rotor, a grinding stator with integrated storage housing, a track mechanism, a shaft, a compression spring and a dispensing tip;
wherein the shaft with an end plug that runs through the center of all sections of the device except the dispensing tip;
wherein the compression spring around the shaft provides vertical compression to precisely dispense the stored contents out the dispensing tip by pressing down on the shaft to let the compression spring return it to the ready state;
wherein the grinding stator with one set of grinding elements and the grinding rotor with a reciprocal set of grinding elements are removably connected to each other and can rotate freely bi-directionally in a circular motion when connected;
wherein the grinding stator storage housing catches the ground herb from the grinding stator via holes in the grinding stator;
wherein the grinding stator storage housing is sealed closed via the dispensing tip, when in the closed position, and the bottom half of the rotor when connected to the top half of the stator;
wherein the dispensing tip can be sealed closed for storage or transport by pressing the shaft with plug down until it seals against the tip and then locking it closed via a mechanical lock.

6. The manually operated portable multi-functional herb grinder of claim 5, wherein the grinding stator and grinding rotor are removably connected with magnets.

7. The manually operated portable multi-functional herb grinder of claim 5, wherein the shaft will spin when pressed down via helical rails in the track mechanism to facilitate a rotating movement while pushing out the ground herb.

8. The manually operated portable multi-functional herb grinder of claim 5, wherein there is a clip attached allowing it to be secured to garments for transport.

9. The manually operated portable multi-functional herb grinder of claim 5, wherein the end plug incorporates an elastomeric seal.

10. A manually operated multifunctional portable herb grinder to grind, store, and vertically dispense dried herbs and other plant materials comprising of a storage container with lid; a bowl, a pipe, a grinding rotor, a grinding stator with integrated storage housing, a track plug mechanism and a dispensing tip;
wherein the storage container with lid houses a bowl, which removably connects to the storage container with lid, with a hole in the bottom for smoking herb and removably connects to the top side of the grinding rotor;
wherein the pipe removably connects to the storage container, passing through the grinding rotor, to seal in the storage container for an airtight seal;
wherein alternate set of holes without the pipe connected allows the user to draw smoke through the hole in the bottom of the bowl into the chamber between the bowl and storage chamber;
wherein the grinding stator with one set of grinding elements and grinding rotor with the reciprocal set of grinding elements are removably connected to each other and can rotate freely bi-directionally in a circular motion when connected;
wherein the grinding stator storage housing catches the ground herb from the grinding stator via holes in the grinding stator;
wherein the grinding stator storage housing is sealed closed via the dispensing tip, when in the closed position, and the bottom half of the rotor when connected to the top half of the stator;
wherein the track plug mechanism comprising of a track and an integrated plug is connected to the grinding stator storage housing to facilitate the opening and closing of the dispensing tip as it moves up and down the track;
wherein the dispensing tip locks into a circular track of the track plug mechanism when in the open position, allowing it to rotate 360° bi-directionally to vertically dispense the contents of the storage housing;
wherein the dispensing tip when in the locked and closed position, is sealed closed via the integrated plug on the track plug mechanism that is internal to the grinder.

11. The manually operated portable multi-functional herb grinder of claim 10, wherein the inside of the dispensing tip contains agitators to help propel ground plant out of the dispensing tip when in the open position.

12. The manually operated portable multi-functional herb grinder of claim 10, wherein the integrated plug incorporates an elastomeric seal.

13. The manually operated portable multi-functional herb grinder of claim 10, wherein the track of the track plug mechanism comprises of helical rails to guide movement of the dispensing tip to open and a mechanical lock at the top of the track to lock the dispensing tip closed.

14. The manually operated portable multi-functional herb grinder of claim 10, wherein the grinding stator with integrated storage housing and the grinding rotor are removably connected with magnets.

* * * * *